July 2, 1968  P. E. ELIZALDE  3,391,292
BRAKES UTILIZING PARASITIC ELECTRIC CURRENTS
Filed June 16, 1965  2 Sheets-Sheet 1
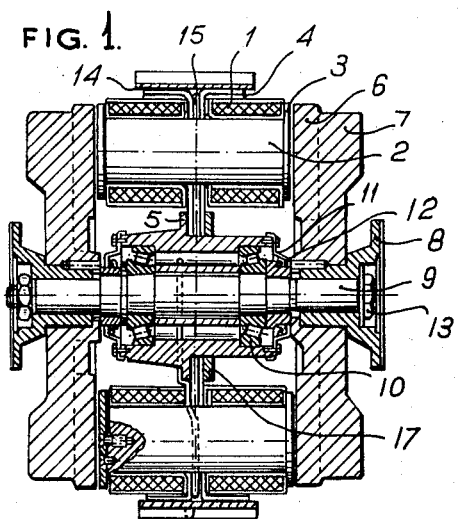
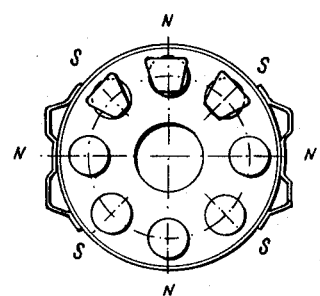
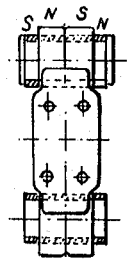
INVENTOR
PEDRO ESPARZA ELIZALDE
BY
ATTORNEYS July 2, 1968 P. E. ELIZALDE 3,391,292
BRAKES UTILIZING PARASITIC ELECTRIC CURRENTS
Filed June 16, 1965 2 Sheets-Sheet 2
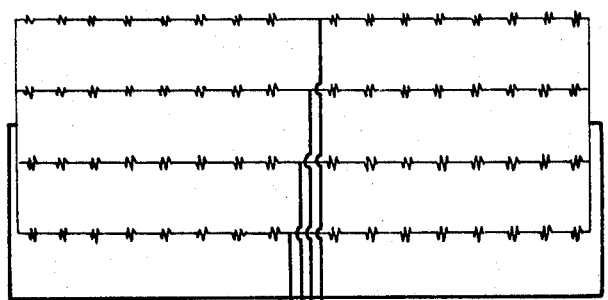
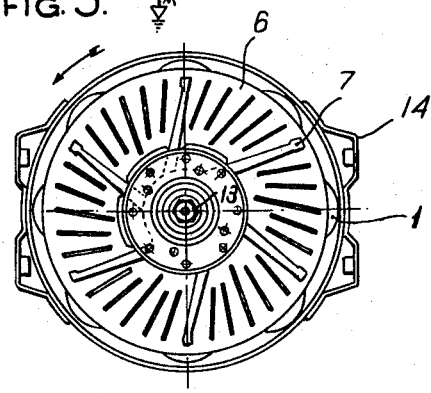
INVENTOR
PEDRO ESPARZA ELIZALDE
BY
ATTORNEYS

United States Patent Office 3,391,292
Patented July 2, 1968

3,391,292
BRAKES UTILIZING PARASITIC
ELECTRIC CURRENTS
Pedro Esparza Elizalde, Calle Bergamin 26,
Navarra, Spain
Filed June 16, 1965, Ser. No. 464,460
7 Claims. (Cl. 310—93)

The present invention relates to improvements made to parasitic current brakes based on Lenz's law, which lays down that in any conducting element subjected to a variable magnetic field, the variation of which may be caused by the movement of said conductor within a constant field, or by the alternation of the field while the conductor remains fixed, a current is produced which tends to oppose the movement, thereby bringing about the effect of braking the moving member.

In accordance with the present invention, and having regard to various possible applications thereof, reference is made more especially to the first case of a member performing a rotating movement and exposed to a constant field of the electromagnetic type.

An apparatus according to the invention comprises:

(a) A member inducing the electromagnetic field and formed by a series of coils whose axes are disposed in a cylindrical surface having an axis common with the axis of the device, said coils having cores of material and dimensions such that the strength of the magnetic field, and consequently the magnetic flux, will be a maximum. These cores are soldered to a yoke in such a manner that the lines of force of the magnetic field are closed within the unit composed of said yoke, the cores of two neighboring coils and their air gaps, and by an armature member.

(b) A rotating armature member the movement of which is originated by connection to a shaft which is to be controlled, said member being mounted on the shaft of the device and made in such a manner, and of such material, as to ensure by adequate induction that the parasitic currents produced in it will be of maximum values. This same armature member is equipped with ventilation blades of such shape and inclination that, without taking any considerable power from the shaft in its natural movement, they will be capable of producing a flow of air which will remove the heat produced in the armature when the kinetic energy of the shaft is converted into heat.

(c) A coil-carrier yoke made of sheet metal stamped into the shape of a cylindrical container.

(d) A fastening member for the whole device, formed by two surfaces disposed diametrically and tangentially to the coil-carrier yoke to which they are connected.

(e) A duplicate arrangement of members composed of the parts referred to in the previous paragraphs, and disposed in such manner that they are connected by the flat part of the coil- carrier yoke, enclosing between them a flat web which gives greater strength to the assembly, and in such a manner that the coils of each assembly, which are symmetrical in relation to the yoke, have the same core, with a consequent increase in effectiveness, thus producing an apparatus of much smaller dimensions and lower weight than one formed by a single assembly of the type described above for obtaining the same degree of braking.

(f) A bush connected to the coil-carrier yoke and serving to receive combined axial and radial thrust bearings which enable the armature members to rotate inside the induction field, the air gap remaining constant.

Other features relating to various elements of the apparatus as a whole will be understood from the detailed description which is given below with reference to the accompanying drawings, in which one preferred form of construction of the apparatus is illustrated by way of illustrative example without limitation, the figures showing conventional views and sections, while this form of construction is subject to modification of detail which do not entail a fundamental alteration of the essential characteristics proposed.

In these drawings:

FIG. 1 is a section along a diametral plane of a complete braking device constructed according to the invention;

FIG. 2 is an end view of the inductor assembly only of the same device;

FIG. 3 is a side view of the inductor body: (in this figure, as in FIG. 2, the induction poles are distinguished by the reference N and S);

FIG. 4 is a diagram of the electrical connections with a ground connection M and four selective operating points illustrated at the terminals, a, b, c, and d; and FIG. 5 is an end view of the entire device and showing the armature cooling arrangement.

According to the embodiment illustrated, the inductor is constituted by coils 1 disposed symmetrically in a cylindrical surface coaxial with the axis of the entire brake assembly, the number of such coils being even and aligned in pairs, each pair enclosing a single core 2 of ferromagnetic material, in such a manner that all the cores are rigidly connected to a coil carrier yoke 4 formed by two metal sheets, each stamped in the form of a pan, and connected at their bases, while between them there is inserted a flat web 15 which provides greater strength to the inductor assembly.

The coils are wound and connected in parallel with each pair connected to one of the operating points or terminals a, b, c and d, FIG. 4. This arrangement is one of the main objects of the present invention since it permits at least the magnetic working of all the coils for each operating point with the consequent advantages, particularly at the first working points, because the following are obtained: more effective cooling of the heat produced in accordance with Lenz's law, because the cooling surface is larger; smaller losses with regard to the individual cores, and improved balancing in the braking action since the armature is acted on by the magnetic field in all the coils.

Assuming that the assembly is equipped with four operating points, a, b, c and d, and taking into account the arrangement of the coils so as to obtain N and S poles alternately in the coils on the same side and inversely in those wound on the same core, it would be necessary to have available an even number of such coils, as illustrated in FIGS. 2 and 3.

The whole inductor assembly comprising the coil and carrier yoke is connected to a bushing 5 by screws, or the like, not shown, in such a manner that a radial flange of said bushing together with a washer 17 fasten pans 4 and web 15 forming the body of the yoke.

The inductor assembly, which as described in this embodiment is the stator, carries supports 14 for fastening to a suitable fixed support member, not shown.

The armature or rotor includes a pair of end plates 6, illustrated in FIG. 5, which are formed of ferromagnetic material containing a low proportion of carbon, so as to ensure the formation of parasitic currents, the remanent magnetism which could take power from the driving member when not acting as a brake being practically zero. Disk-like plates 6 are equipped with substantially radial apertures which are, however, inclined slightly outwardly away from the direction of rotation, with the object of promoting internal cooling and with similarly disposed cooling blades 7 which assist the circulation of air to reduce the dynamic pressure to permissible values and thus ensure that the consumption of power in the usual rotatory movement will not exceed the value expected, while at the same time they remove the heat produced in the rotor when the kinetic energy is converted into heat.

In addition to increasing the cooling surface, the aforesaid blades, being inclined at a prearranged angle in relation to the diametral axes, effect the evacuation of the hot air, admitting cold air and not permitting the temperature of the apparatus to reach values which could impair the good operation of the unit.

A removably fitted shaft 9 is connected to the rotating members 6 by couplings 8 and keys. Drive of shaft 9 is effected by means of nuts 13 which press against the end plates shown closing the couplings for connection to the ends of a shaft to be controlled, or braked.

The relative movement between the inductor and the armature is accommodated by means of combined axial and radial thrust bearings 10, lubrication being effected through passages 16, losses of oil and the penetration of dirt being prevented by means of retainers 12 held in retainer holders 11. Side or pole pieces 3, screwed to the cores 2, fasten the coils to the latter, while at the same time forming constant air gaps between each pair of coils and the rotor plates 6.

Although a certain specific embodiment of the invention has been shown and described, it is obvious that many modifications thereof are possible. The invention, therefore, is not to be restricted except insofar as is necessitated by the prior art and by the spirit of the appended claims.

What is claimed is:

1. A device for electrically breaking rotating elements, comprising an inductor assembly including a plurality of pairs of coils disposed symmetrically and spaced to define a cylindrical surface having an axis coaxial with the axis of the rotating element which is to be braked, each coil of said pairs of coils being aligned with the associated coil of the pair and each pair of coils enclosing one ferromagnetic core, an armature including a pair of disk-like plates having axes coaxial with said axis of the inductor assembly and said plates spaced equidistant from opposite ends of said pairs of coils, means for fixedly securing said coils and cores to a rigid support, and means rotatably supporting said armature plates with respect to said inductor assembly and including a shaft connectable to the element to be braked.

2. A device as claimed in claim 1 wherein pole pieces are positioned at the ends of each pair of coils and connected to said cores, said pole pieces being formed of the same material as said cores.

3. A device as claimed in claim 1 wherein the windings of each of said coils is connected in parallel with the winding of the associated coil mounted on the same core so that application of electric energy to any pair of said coils will create magnetic flux in the cores of all of the coils.

4. A device as claimed in claim 1 wherein said shaft is supported in said inductor assembly by combined axial and radial thrust bearings carried by a bushing rigidly connected to a yoke fastened to said coils, said shaft having connecting plates at its ends which permit connection to the element to be braked.

5. A device as claimed in claim 1, wherein said armature plates have a plurality of uniformly distributed substantially radial perforations through which currents of air flow to promote cooling.

6. A device as claimed in claim 5, wherein said armature plates are also provided with fan blades disposed at substantially the same inclination as said perforations to force circulation of air through and away from said device.

7. A device as claimed in claim 1 wherein said inductor assembly further includes a yoke comprising a pair of pan-shaped members placed bottom to bottom spaced by a flat web, and means securing said pan bottoms and web together, the cores of said pairs of coils being secured to the cylindrical surface formed by the sides of said pair of pans.

References Cited
UNITED STATES PATENTS

| 2,110,663 | 3/1938 | Gouldthorpe | 310—93 |
| 2,190,650 | 2/1940 | Carew et al. | 188—161 |
| 2,632,859 | 3/1953 | Bessiere | 188—164 XR |

ROBERT K. SCHAEFER, *Primary Examiner.*

H. O. JONES, *Assistant Examiner.*